(12) United States Patent
Ehnebuske et al.

(10) Patent No.: US 7,103,564 B1
(45) Date of Patent: Sep. 5, 2006

(54) METHOD AND APPARATUS FOR PERFORMING PERSONALIZATION BASED ON CLASSIFICATION

(75) Inventors: David Lars Ehnebuske, Georgetown, TX (US); Robert Simon Goodman, Austin, TX (US); Barbara Jane Alspach McKee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 09/640,513

(22) Filed: Aug. 17, 2000

(51) Int. Cl.
*G06F 17/60* (2006.01)
(52) U.S. Cl. ...................................................... 705/14
(58) Field of Classification Search ................ 705/1, 705/14
See application file for complete search history.

(56) References Cited

U.S. PATENT DOCUMENTS

| | | | |
|---|---|---|---|
| 5,991,735 A | 11/1999 | Gerace | 705/10 |
| 6,044,205 A | 3/2000 | Reed et al. | 345/200.31 |
| 6,341,369 B1 | 1/2002 | Degenaro et al. | |

OTHER PUBLICATIONS

Taylor, David A, "Object-Oriented Information Systems," 1992, John Wiley & Sons, Inc., pp. 1-3, 27-31, 41-44, 83-85, 224-226.*

* cited by examiner

*Primary Examiner*—Jeffrey D. Carlson
(74) *Attorney, Agent, or Firm*—Duke W. Yee; David A. Mims, Jr.; Lisa L.B. Yociss

(57) ABSTRACT

A method and apparatus for personalizing information content for delivery to a requesting user is provided. With the method and apparatus, a set of actions needed to retrieve and organize requested content for a particular content request are selected and executed based on the concept of classifying the current situation, e.g., the requesting user attributes and the current system setting, along any number of predefined dimensions. The definition of what dimensions of classification there are and what distinctions are drawn during the process of classification is defined by the business application administrator. Once a classification definition is in place, it may be used and reused, along with other classifications, to be associated with actions that select the appropriate content. In order to describe what actions to take under a variety of business conditions, an administrator chooses a classifier to be used to assess the business situation, selects the relevant classifications and associates one or more actions with each classification to be invoked by a selector.

21 Claims, 6 Drawing Sheets

FIG. 4

```
Promotionals                                      400
   for Season
      Holiday
         for Weekpart
            Weekend
               select WeekendHolidayPromos
            otherwise
               select WeekendHolidayPromos
            always
               sortByInventory
      Winter or Fall
         select CoolWeatherPromos
         sort ByInventory
      otherwise
         select LowSeasonPromos
      always
         filterOutNoStockItems
```

FIG. 5

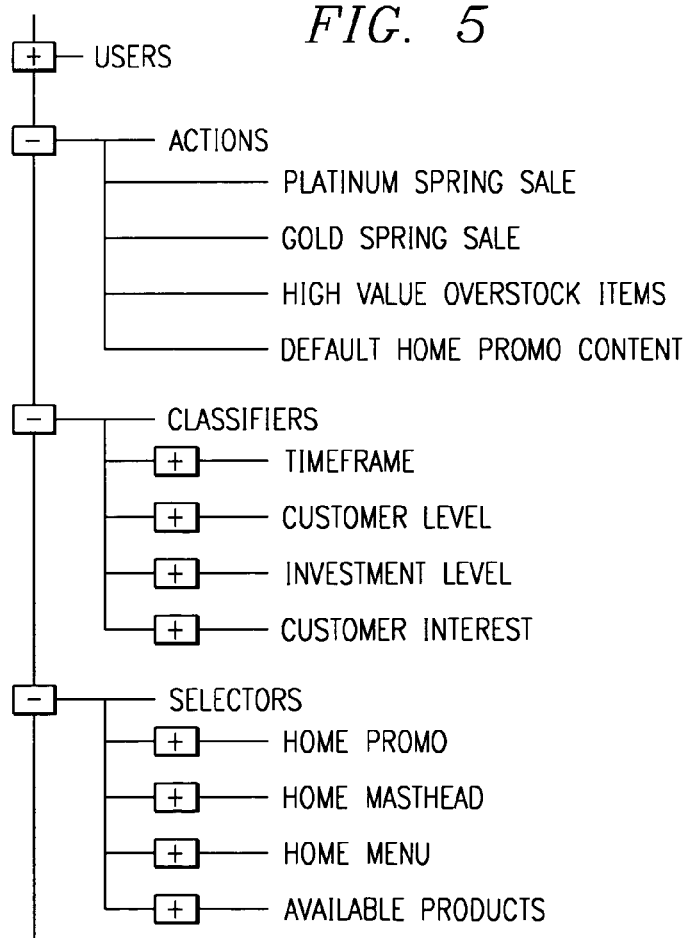

- [+] USERS
  - [−] ACTIONS
    - PLATINUM SPRING SALE
    - GOLD SPRING SALE
    - HIGH VALUE OVERSTOCK ITEMS
    - DEFAULT HOME PROMO CONTENT
  - [−] CLASSIFIERS
    - [+] TIMEFRAME
    - [+] CUSTOMER LEVEL
    - [+] INVESTMENT LEVEL
    - [+] CUSTOMER INTEREST
  - [−] SELECTORS
    - [+] HOME PROMO
    - [+] HOME MASTHEAD
    - [+] HOME MENU
    - [+] AVAILABLE PRODUCTS

METHOD AND APPARATUS FOR PERFORMING PERSONALIZATION BASED ON CLASSIFICATION

CROSS REFERENCE TO RELATED APPLICATION

The present invention is related to applications entitled "Method and Data Processing System for Specifying and Applying Rules to Classification-Based Decision Points in an Application System", U.S. patent application Ser. No. 09/204,970, filed on Dec. 3, 1998; "Method And Apparatus For General Integrity Rule Checking Point In An Application", U.S. patent application Ser. No. 09/204,971, filed on Dec. 3, 1998; "Method And Apparatus For Applying Business Rules In An Object Model Driven Context", U.S. patent application Ser. No. 09/204,973, filed on Dec. 3, 1998; "Managing Business Rules and Using Jurisdiction", U.S. patent application Ser. No. 09/134,341, filed Aug. 14, 1998; and "Method and Apparatus for Identifying Applicable Business Rules", U.S. patent application Ser. No. 09/993,718, filed on Dec. 18, 1997, which are incorporated herein by reference.

BACKGROUND OF THE INVENTION

1. Technical Field

The present invention relates generally to an improved data processing system and in particular to an improved method and apparatus for managing a business system using classifications. Still more particularly, the present invention relates to an apparatus and method for specifying the dynamic content to be associated with a user of an application, based on characteristics of the user.

2. Description of Related Art

As businesses increasingly migrate to the Internet, the ability to provide users with an interactive experience that is interesting and easily interfaced with has become more important. Some business Web sites, for example, fail to even attract the casual visitor while others may attract the casual visitor but fail to retain them as the Web site may be too cumbersome for the casual visitor to use. These failures to attract and keep the casual visitor result in lost business opportunities.

One way in which businesses attempt to combat this problem is to make their Web sites and Internet applications more personalized to the particular user using information that is known or gathered and retained about the user and his encounter with the business application. The conventional way in which this personalization is performed is using a decision engine that takes user information and generates personalized content and/or function. The decision engine is frequently a rules engine that makes use of a plurality of nested if-then-do decision rules to determine what content/functions should be provided to the particular user.

When a personalization task is to be performed using this conventional decision engine, all of the rules in the decision engine must be executed. The ones whose if part evaluates to true, result in the do part being executed. Those that evaluate to false are ignored. The do part of the final rule in the chain frequently selects, orders or filters content, or performs some function, usually asynchronously, such as sending an acknowledgement electronic mail, or the like. In some implementations, the do parts may change the conditions tested in the if parts, causing the set of rules to be iteratively recalculated.

With the above approach, it is never very clear which of the actions are going to be taken at any given time, given a set of non-overlapping circumstances. While some of the ambiguity could be resolved by combining sets of conditions into compound if parts, this frequently yields an explosion in the number of rules. For example, Rule 1 specifies what to do when parts a, b, c are all true; Rule 2 specifies what to do when parts a and b are true, but part c is false; Rule 3 specifies what to do when part a and c are true, but part b is false, and so on.

Because it is not very clear which of the actions are going to be taken at any given time, if business conditions change and a change to the decision engine is required, it becomes very difficult to determine which decisions need to be changed. If further becomes difficult to determine how the change in one decision will affect other decisions in the decision engine. Thus, an analyst is required to trace all of the possible decisions to determine if the decision engine will work properly under all possible conditions.

Furthermore, with the conventional decision engine, all of the rules in a rule set are at least partially executed (their if parts), as described above, even when many of the conditions do not remotely apply. This results in a performance degradation because rules that will result in a false determination will be executed and computing cycles will be wasted.

Thus, it would be beneficial to have a method and apparatus for performing personalization based on classification in which changes in decision rules may be performed relatively effortlessly and in which only the decisions necessary for a particular classification are executed.

SUMMARY OF THE INVENTION

The present invention provides a method and apparatus for personalizing information content for delivery to a requesting user. With the method and apparatus of the present invention, a set of actions needed to retrieve and organize requested content for a particular content request are selected and executed based on the concept of classifying the current situation, e.g., the requesting user attributes and the current system setting, along any number of predefined dimensions. The definition of what dimensions of classification there are and what distinctions are drawn during the process of classification is defined by the business application administrator.

Once a classification definition is in place, it may be used and reused, along with other classifications, to be associated with actions that select the appropriate content. In order to describe what actions to take under a variety of business conditions, an administrator chooses a classifier to be used to assess the business situation, selects the relevant classifications and associates one or more actions with each classification to be invoked by a selector.

Thus, the present invention provides a mechanism by which personalization of content and functionality may be performed without having to traverse large if-then-do based decision chains. This is due to the compartmentalization of the business application into selector objects, classifier objects, and action objects. Only those classifier objects invoked by the selector object are traversed. Similarly, only those action objects corresponding to an applicable classification are executed.

The mechanism of the present invention allows for ease of modification by modifying only those objects that are necessary to implement the desired business logic. Thus, a single action object may be modified in order to make a modification in the way a plurality of selector objects operate.

The impact of the modification on other sections of the business application can be easily discerned by identifying the selector objects that invoke the modified objects. Thus, for example, it can be determined that a change in an action object will affect the operation of multiple selector objects and thus, if the affect on one or more of these selector objects is unwanted, a new action object may be generated to compensate for the unwanted operation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an exemplary diagram illustrating the operational functions of a selector object in accordance with the present invention;

FIG. 5 is an exemplary diagram illustrating a personalization tool in accordance with the present invention;

DETAILED DESCRIPTION OF THE PREFERRED EMBODIMENT

The present invention provides a method, apparatus, and instructions for specifying, applying and managing business classifications for identifying actions to be performed to generate personalized content and/or function for a user. The present invention makes use of selector objects, classifier objects, and action objects to provide personalized content and function based on information gathered about a user.

The selector objects provide a mechanism for specifying and managing the actions that are to be taken to respond to a user's request for content/function. The classifier objects provide a mechanism for defining and managing reusable building blocks that the selector objects use to distinguish among different situations so that they can select the correct actions when responding to requests for content/function from users. The action objects identify actions that are to be performed when the action object is invoked.

The present invention may be implemented in a stand alone data processing system or in a distributed data processing system. For example, the present invention may be implemented in a personal computer or in a distributed data processing system in which a server and client device interact. The following is a brief description of each of these possible data processing environments in which the present invention may be implemented.

Figure 1:
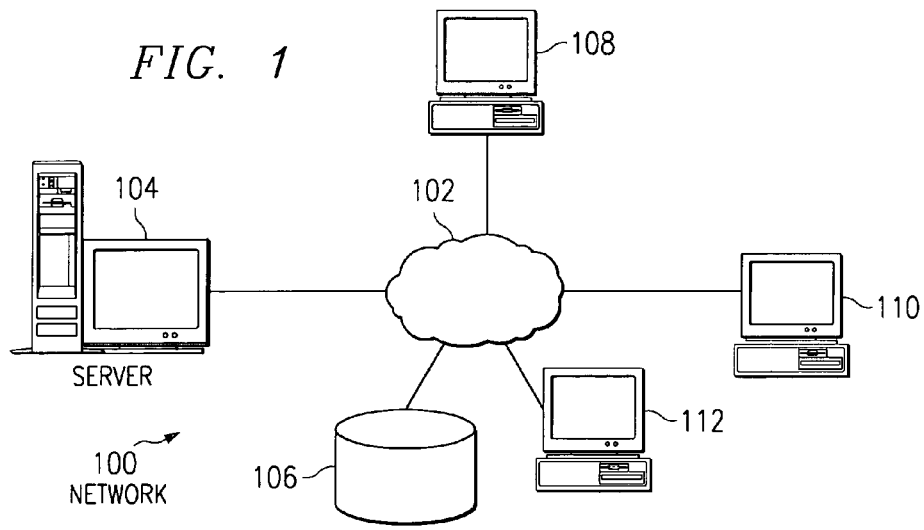
FIG. 1 is an exemplary diagram illustrating a distributed data processing system in which the present invention may be implemented.

FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

The present invention provides a mechanism for establishing data flow from a trusted server, such as server 104, to a client device, such as client 110, over a non-secure link and still be able to make sure the data has not been changed during transmission. The present invention is applicable to any type of signed and unsigned code that may be transmitted, for example, over the network 102. In the preferred embodiments of the present invention, as described hereafter, a platform independent code will be assumed and specifically, Java code will be assumed for purposes of illustration.

Figure 2A:
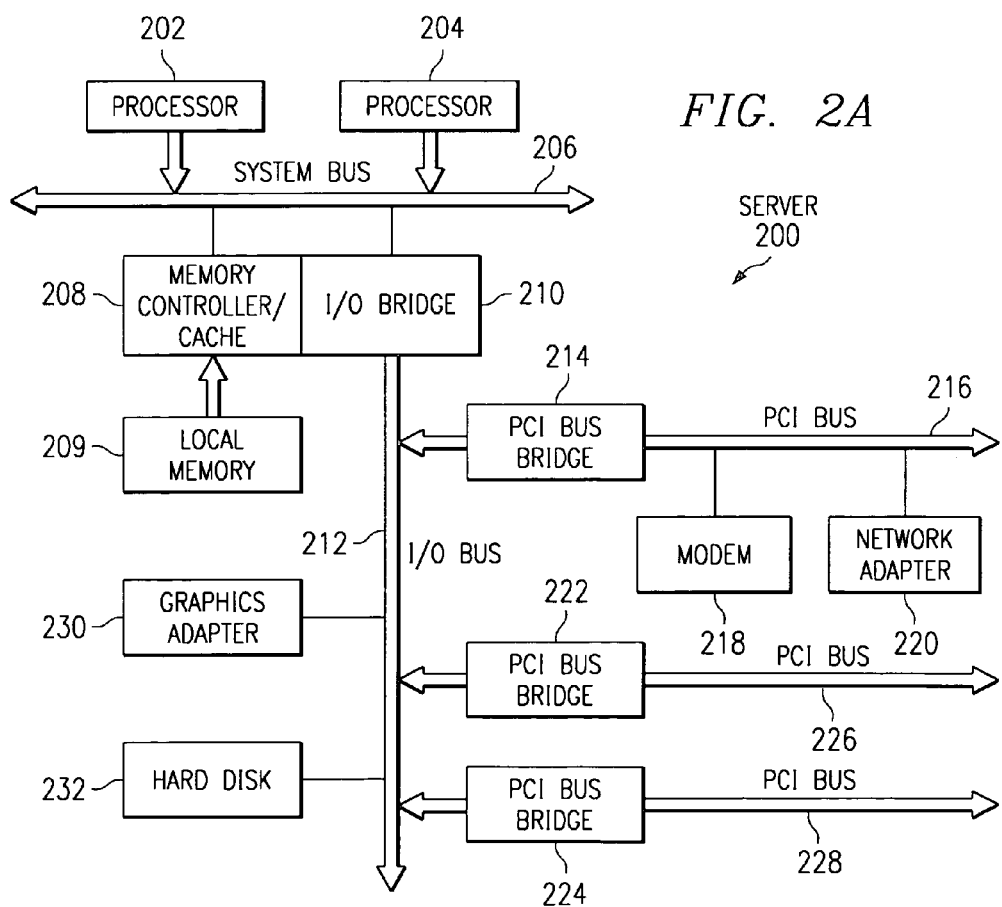
FIG. 2A is an exemplary diagram illustrating a server data processing system in which the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206.

Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
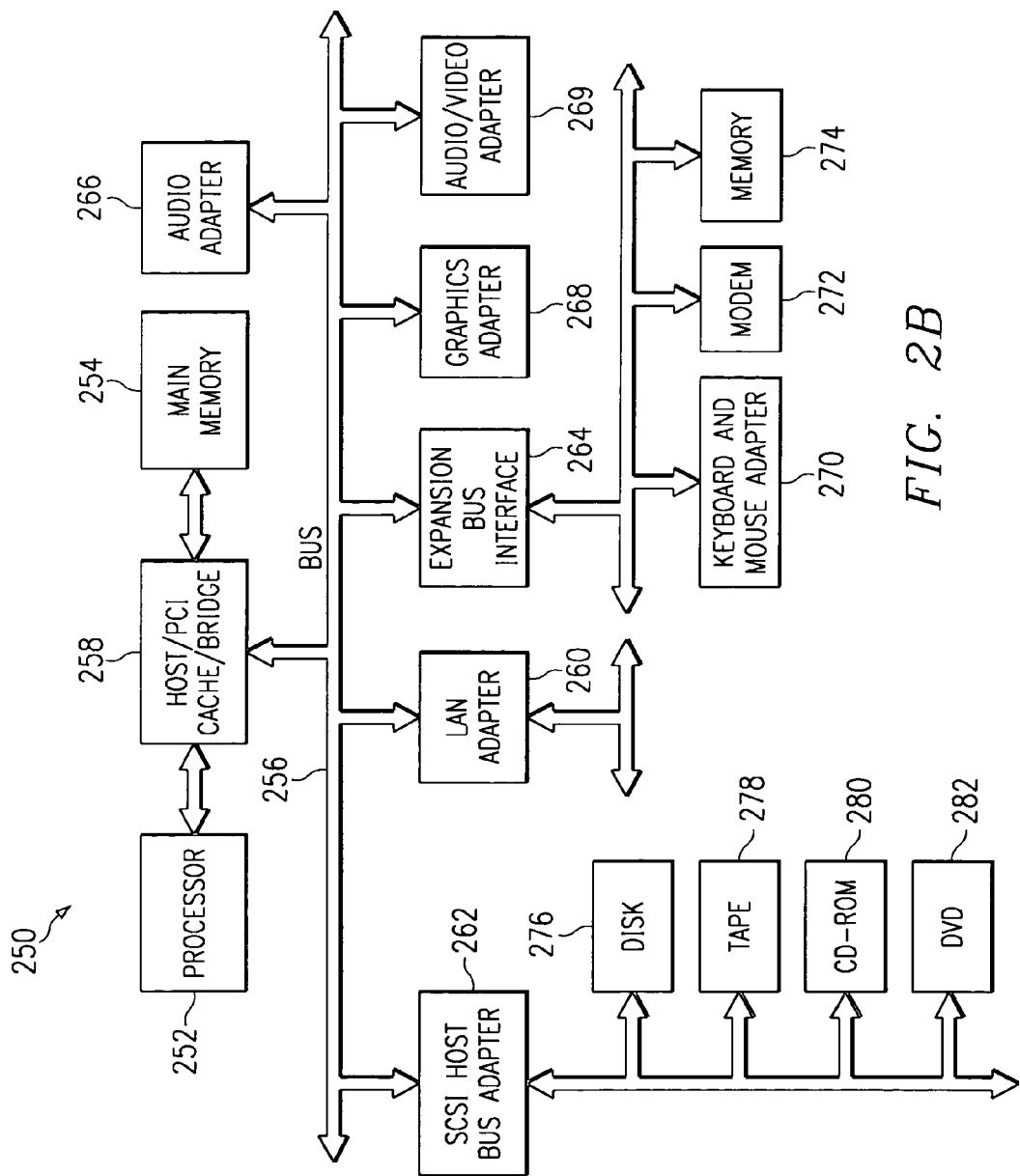
FIG. 2B is an exemplary diagram illustrating a client data processing system in which the present invention may be implemented.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards.

In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as Java OS or OS/2, which are available from International Business Machines Corporation. Java OS is loaded from a server on a network to a network client and supports Java programs and applets. An object oriented programming system, such as Java, may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a mechanism for applying and managing business classifications for identifying actions to be performed to generate personalized content and/or function for a user. The present invention makes use of selector objects, classifier objects, and action objects to provide personalized content and function based on information gathered about a user.

Figure 3:
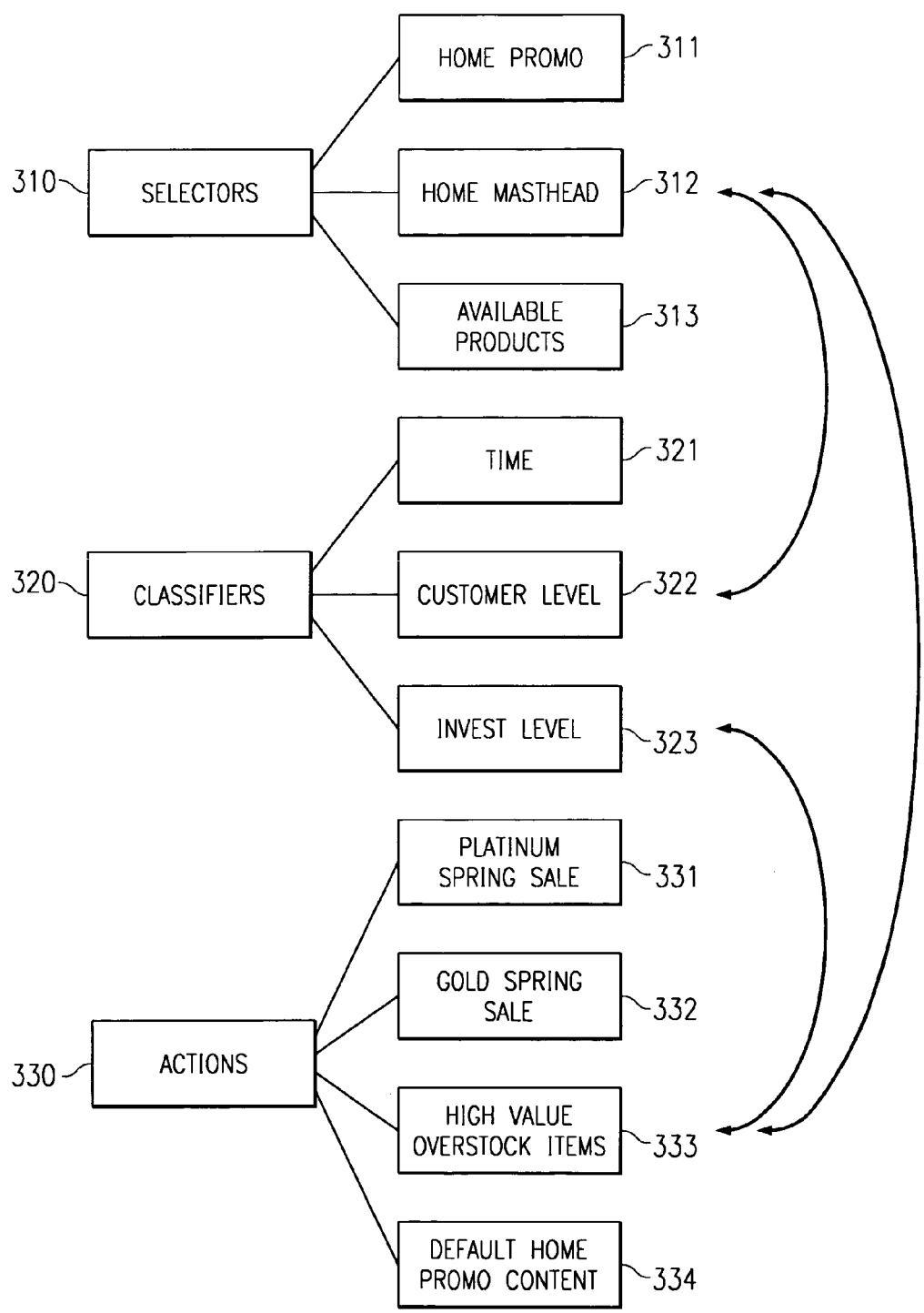
FIG. 3 is an exemplary diagram illustrating the object architecture in accordance with the present invention.

FIG. 3 shows an exemplary diagram illustrating the interaction of the selector objects (selectors), classification objects (classifiers) and action objects (actions). The selector objects 310 may be invoked by a business application to perform a selection of actions for personalizing content and/or functionality. The classification objects 320 may be invoked by selector objects 310 for classifying various user data and system data for use in determining actions to be performed for the personalization of the content/functionality. The action objects 330 may be invoked by the selector objects 310 to perform the various actions necessary to provide personalized content/functionality. The action objects 330 may be invoked based on the classification of user data and/or system data obtained from the classification objects 320.

As shown in FIG. 3, the selectors 310 may be comprised of any number of selection objects that are defined by a user of the system. In the particular example shown in FIG. 3, the selectors 310 include a home promo selector 311, a home masthead selector 312 and an available products selector 313. The home promo selector 311 selects a promotional advertisement to be provided to a user on a home page of the business web site, the home masthead selector 312 selects a masthead to be displayed to the user on the home page of the business web site, and the available products selector 313 selects the products to be provided to the user as available products.

The classifiers 320 provide mechanisms for defining and managing reusable building blocks that selectors use to distinguish among different situations so that they can select the correct actions when responding to requests from users. The classifiers 320 describe a variety of business conditions and a set of named variants of the business situation called classifications. For example, there might be a classifier named "Season" defining classifications for spring, summer, fall and winter.

In the particular example shown in FIG. 3, the classifiers 320 include a time classifier 321, a customer level classifier 322, and an investment level classifier 323. The time classifier 321 is used to determine in which class the current time falls, i.e. spring, summer, fall, winter, holiday season, weekend, weekday, etc. The customer level classifier 322 determines a current customer level classification for the user requesting content. The investment level classifier 323 determines a current investment level of the user.

Classifiers can be combined to further qualify the business situation. Combining classifiers further constrains when a corresponding action will occur. For example, an administrator may include "Weekpart is Weekend" in addition to "Season is Holiday" as classifiers for identifying an action to be performed. Thus, only when the current situation can be classified as a weekend and a holiday season will the corresponding action be performed.

The classifiers are usable in many different selectors 310. Thus, for example, the home promo selector 311 and the available products selector 313 may both use the time classifier 311 to identify actions to be invoked. Thus, only one instance of the time classifier 311 is required for use by a plurality of different selector objects 310.

The actions 330 are used to perform various actions for personalizing information content and functionality of the business application, such as a business web site and the like. The actions 330 are invoked by selectors 310 which use the actions 330 to perform a specified function, such as displaying a particular advertisement, displaying a list of high value overstock items, displaying a list of gold customer spring season items for sale, checking order status, calculating a credit limit, determining a current available credit, playing a music file, and any other function that may be performed in a data processing environment.

In addition to specifying actions that are performed when a classification applies, a selector 310 may also include action that are always performed regardless of whether any classifications apply. These are referred to as "Always" actions. Moreover, the selector 310 may include actions that are performed only when no classifications apply. These are referred to as "Otherwise" actions.

In the example shown in FIG. 3, the actions 330 include a platinum spring sale action 331, a gold spring sale action 332, a high value overstock items action 333, and a default home promo content action 334. The actions 330 may be invoked by a plurality of different selectors 310. Thus, the same action 330 may be associated with a home promo selector 311 and an available products selector 313. Furthermore, the same selector 310 may make use of the same action 330 for a plurality of classifications of one or more classifiers 320 in which the user data and/or system data may be classified. In this way, only one instance of the action 330 is required for the same action to be performed in a plurality of different situations.

Thus, the present invention compartmentalizes the personalization of the generation of information content and functionality into selectors, classifiers, and actions. By compartmentalizing the personalization, it is easier for an administrator of the business application to determine the interaction of the personalization components that make up the business application. In other words, if an action is changed due to, for example, a different business methodology being adopted, it is easy for the administrator to determine how this change will affect the system by determining which actions are associated with various selectors and how those actions are invoked by the selectors based on the classifications of the classifiers. In a similar manner, classifiers and selectors may be modified, based on changes in desired operation of the business application, in a straight forward and easy manner such that the impact of such changes on the operation of the business application can be readily recognized.

For example, if the gold spring sale action 332 were modified to perform a slightly different function than was previously performed, it can be determined from the architecture shown in FIG. 3 that this change will impact the selectors 310 that invoke the gold spring sale action 332 based on classifications in the time classifier 321 and the customer level classifier 322. This is because the selectors 310 invoke the gold spring sale action 332 if the time of the year is spring and the customer level is determined to be gold.

Similarly, if the customer level classification were modified to provide an additional customer level classification, such as silver customer, it can be determined that the selectors 310 that invoke the customer level classifier 322 may result in the customer being a silver level customer. In this case, a new action may need to be defined for performing personalization of content for the silver level customer. However, an existing action could be associated with the silver level classification in any of the selectors 310 that utilize the customer level classifier 321. Thus, the administrator may define a new silver level customer by modifying the customer level classifier 321 and adding one or more actions for the silver level customer in all selectors that use the customer level classifier 321.

In the prior art, in order to perform modifications of the business application logic, an administrator must traverse each of the levels of if-then-do statements to determine where to make the modifications and how to make the modifications. Furthermore, the administrator must again traverse each of the levels of if-then-do statements for each possible combination of input parameters to determine if the modifications adversely affect other parts of the business application. Thus, the present invention provides a much more easily manipulated architecture for implementing business logic in a business application and for making modifications to that business logic.

FIG. 4 is an example of an operational outline of a selector in accordance with the present invention. The operations shown in FIG. 4 are performed using the classifier objects and action objects described above.

As shown in FIG. 4, the selector 400 is identified as "Promotionals." The selector 400 uses the classifier "Season" to determine a classification of the current situation. Similarly, the selector 400 uses the classifier "Weekpart" to determine the current part of the week for the Holiday season. The classifier "Season" has as least the following possible defined classifications: Holiday, Winter or Fall since these are explicitly called out. The "Weekpart" classifier has at least the following possible defined classifications: weekend since it also is explicitly called out.

Using the selector 400, the current situation is analyzed to determine first, if it is currently a Holiday season, Winter season or Fall season. This determination is made using the "Season" classifier object. If it is a Holiday season, it is determined whether it is a weekend or not. This determination is made by the "Weekpart" classifier object. Based on these classifications, various content are retrieved by the selector using the action objects "WeekendHolidayPromos," "WeekdayHolidayPromos," "sortByInventory," "CoolWeatherPromos," and "LowSeasonPromos."

Thus, for example, if the season is a holiday season and the weekpart is a weekend, the "WeekendHolidayPromos" action object will be invoked. Similarly, if the season is "Winter or Fall", the "CoolWeatherPromos" action object will be invoked. If the season is neither a holiday nor Winter or Fall, the "LowSeasonPromos" action object is invoked by the selector. Regardless of what the ultimate classification applies to the current situation, the action object "filterOut-NoStockItems" is always invoked by the selector.

When executing a selector like that shown in FIG. 4, all of the classifications in an encountered classifier are evaluated for applicability, from top to bottom. Thus, rather than having to traverse all defined classifiers and all of the classifications in each of the defined classifiers, as would be required in conventional if-the-do decision engines, the present invention is able to ascertain which subset of the classifiers to execute and which actions should be executed by the selector based on a positive classification match using the subset of classifiers.

Figure 6:
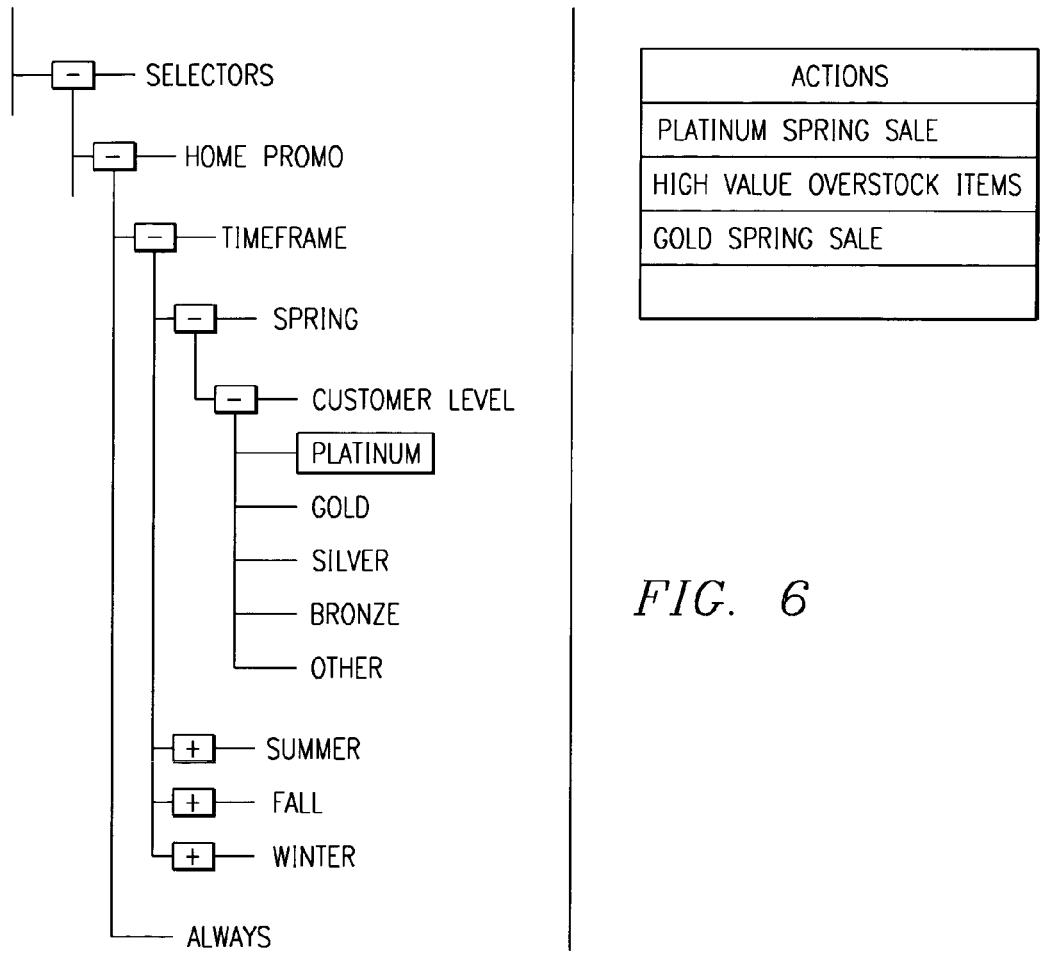
FIG. 6 is an exemplary diagram illustrating a classification definition in accordance with the present invention.
Figure 7:
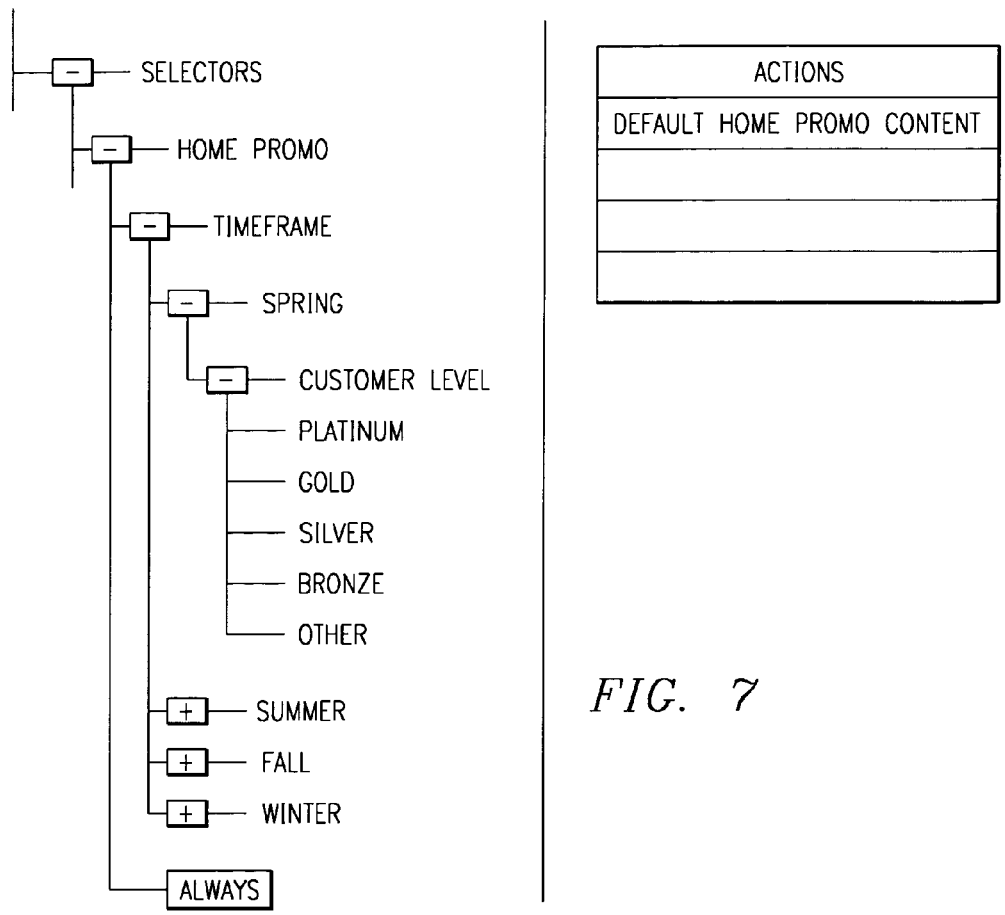
FIG. 7 is an exemplary diagram illustrating an Always object definition in accordance with the present invention.

FIGS. 5–7 illustrate a portion of a personalization tool for specifying the personalization parts of a business application using the architecture outlined above. It should be appreciated that the tool depicted in FIGS. 5–7 is used only for illustrative purposes and is not meant to be limiting in any way. Those of ordinary skill in the art will appreciate that the functionality of the tool depicted in FIGS. 5–7 may be implemented in many different ways without departing from the spirit and scope of the present invention.

FIG. 5 shows a first view of the personalization tool in which users, actions, classifiers and selectors are defined. The users section stores user information for users that have been registered with the tool. This user information may include any type of information that generally describes the registered user and what the user is doing. Thus, the user information may include, for example, age, race, sex, marital status, annual income, credit card numbers, product preferences, address and other contact information, and the like, as well as what has been read or purchased.

The actions section contains all of the action objects that have been defined for the personalization tool. These action objects, as discussed above, perform various actions, such as providing various combinations of information content, which may be invoked by one or more of the selectors. The action objects that have been defined in the depicted example include "Platinum Spring Sale," "Gold Spring Sale," "High Value Overstock Items," and "Default Home Promo Content."

The classifiers section contains all of the classifier objects that have been defined for the personalization tool. These classifier objects, as discussed above, identify classifications in which a requesting user and/or the current system situation may be classified. The classifier objects may be invoked by one or more of the selectors. The classifier objects that have been defined in the depicted example include "Timeframe," "Customer Level," "Investment Level," and "Customer Interest."

The selector section contains all of the selector objects that have been defined for the personalization tool. The selector objects, as discussed above, perform the function of implementing the overall business logic that is to be performed. The selector objects invoke classifier objects and action objects to perform the business logic. This may include, for example, providing personalized information content, via a customized web page, to a user based on the user information for that user.

The particular embodiment of the tool shown in FIG. 5 is that of an expandable tree. New items may be added to the tree by selecting the section in which the new item is to be added, and choosing an add function from, for example, a menu (not shown) using an input device such as a mouse or other pointing device. Once the add function is initiated, the user must enter a description of the new item to be added. If this new item is an action object, for example, the user my need to add a name for the action object and a function to be performed by that action object. For example, the action object "Platinum Spring Sale" may have a definition that includes the name of the action object, an action type (such as Catalog Selection), a catalog identifier (such as Spring), and a selection criteria (such as category=Promotional & Price >=24.99). Thus, using the "Platinum Spring Sale" action object, all products in the Spring catalog that are promotional items and cost $24.99 or more will be provided to the requesting user.

If the new item is a classifier object, the user may need to specify a name of the classifier object, the classifications associated with the classifier object, and the criteria for being classified in each of the classifications. For example, for the classifier object "Timeframe" there may be four classifications: Spring, Summer, Fall, Winter. The criteria for being classified in the Spring classification may be, for example, today.month >=4 & today.month <=6. Thus, if today's month is April, May or June, the Spring classification will be selected.

If the new item is a selector object, the user may need to define a name for the selector object, the classifier objects, and action objects to be invoked when certain classifications do and do not apply, and the like. The selector object may include "Always" actions and "Otherwise" actions as described above.

Likewise, existing item may be modified by selecting them using the pointing device and modifying the items definition. Similarly, items may be deleted from a section based on a selection of the item and the selection of a delete function using, for example, a menu and a pointing device. The interface for performing the addition, modification and deletion of items is similar to user interfaces generally known in the art and is therefore, not described in further detail.

FIG. 6 illustrates a definition of a classification within a classifier object in accordance with the present invention. As shown in FIG. 6, classifications may be nested such that very specific personalization of the business application may be obtained. In the example shown in FIG. 6, the selector object "Home Promo" contains the classifier object "Timeframe" which contains the classifications Spring, Summer, Fall and Winter. The Spring classification further includes a Customer Level classifier object which has classifications of Platinum, Gold, Silver, and Bronze. The Other classification is used to identify actions to perform when none of the other classifications in the Customer Level classifier apply.

Further, as shown in FIG. 6, in the selector Home Promo, the classification Platinum for customer level has three actions associated with it: Platinum Spring Sale, High Value Overstock Items, and Gold Spring Sale. In other words, if the classifications of Spring and Platinum apply to the user data and system data, these three actions will be invoked by the selector. Thus, the products that are selected by each of these action objects will be presented to a requesting user if the current time frame is spring and the requesting user's customer level is platinum.

Also, as shown in FIG. 6, the end of the list of classifications for Customer Level includes the classification Other. This construct provides a place to put action objects for cases in which a classifier does not recognize the current situation as something specific, i.e. in the depicted example, the customer level is not determined to be Platinum, Gold, Silver or Bronze. Thus, if the time frame is spring but the customer level is not one of platinum, gold, silver or bronze, the selector will invoke actions associated with the classification "other."

In addition, the Home Promo selector object contains the Always object. An Always object can occur on any non-terminal node in the selector objects subtree. Always objects are terminal nodes whose associated actions are always executed in addition to whatever action objects are invoked based on the classifications selected. As shown in FIG. 7, the Always object contains the action "Default Home Promo Content." Thus, the default home promo content will always be provided to the requesting user in addition to the content obtained from action objects invoked based on classification. The Always object is a convenient place to put ordering and filtering algorithms prior to returning selected content to the user.

Figure 8:
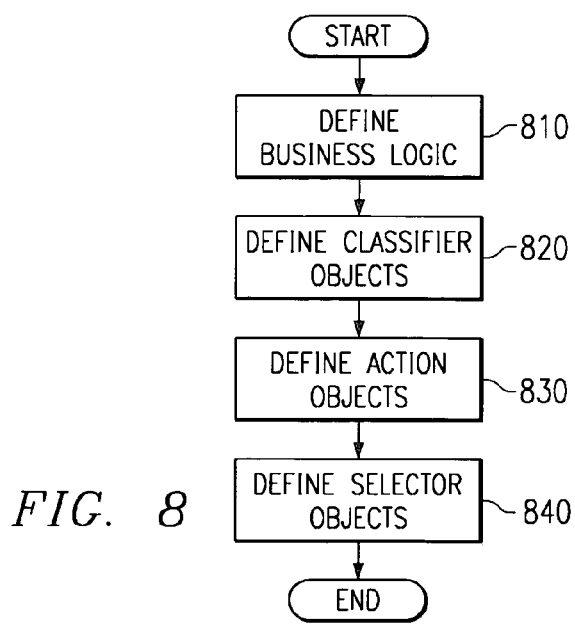
FIG. 8 is a flowchart outlining an exemplary operation of the present invention when defining a business application.

FIG. 8 is a flowchart outlining an exemplary operation of the present invention when generating a personalized business application. As shown in FIG. 8, the operation starts with defining the business logic that is to be implemented by the business application (step 810). Then, the various classifier objects and classifications that are to be used in the business logic are defined (step 820). These describe the various characteristics that may cause the business logic or function to vary for a user of the business application. The action objects are defined (step 830). These usually represent subsets of content, business functions, or common functions. The selector objects are then defined (step 840) by associating actions with classifications. The operation then ends.

Figure 9:
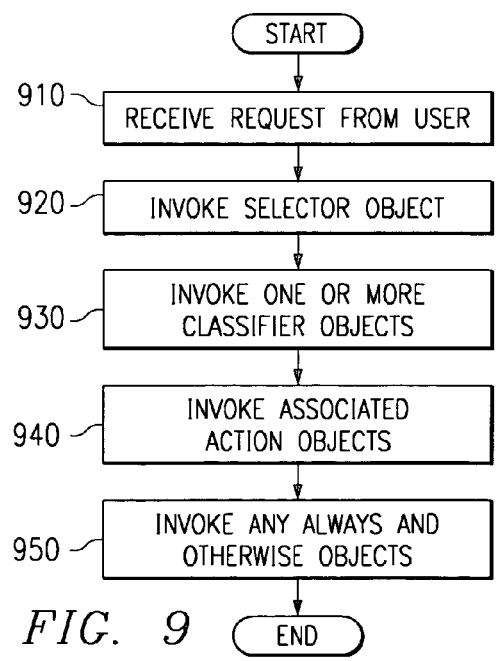
FIG. 9 is a flowchart outlining an exemplary operation of the present invention when classifying a request from a user.

FIG. 9 is a flowchart outlining an exemplary operation of a personalized business application of the present invention when determining what action objects to invoke based on a request from a user. As shown in FIG. 9, the operation starts with receiving a request for information content from a user (step 910). A selector object is invoked by the business application (step 920). The selector object invokes one or more classifier objects which determine which classifications the user and the current system situation fall under (step 930).

The action objects associated with the applicable classifications are invoked (step 940). Any Always or Otherwise action objects are then invoked (step 950). The operation then ends.

Thus, in summary, with the method and apparatus of the present invention, the set of actions needed to retrieve and organize the required content for a particular content request are selected and executed based on the concept of classifying the current situation, e.g., the requesting user attributes and the current system setting, along any number of pre-defined dimensions. This contrasts with designs in which a large bucket of rules is executed for each request, each rule consisting of a condition part that determines whether the rule applies for the current request and an operation part that is executed if the condition is true.

The definition of what dimensions of classification there are and what distinctions are drawn during the process of classification is defined by the business application administrator. For example, an administrator might define customer levels as one way to classify things and distinguish platinum, gold, silver and bronze level customers based on whatever criteria makes business sense. Once a classification definition is in place, it may be used and reused, along with other classifications, to be associated with actions that select the appropriate content. In order to describe what actions to take under a variety of business conditions, an administrator chooses a classifier to be used to assess the business situation, selects the relevant classifications and associates one or more actions with each classification to be invoked by the selector.

Thus, the present invention provides a mechanism by which personalization of content and functionality may be performed without having to traverse large if-then-do based decision chains. This is due to the compartmentalization of the business application into selector objects, classifier objects, and action objects. Only those classifier objects invoked by the selector object are traversed. Similarly, only those action objects corresponding to an applicable classification are traversed.

The mechanism of the present invention allows for ease of modification by modifying only those objects that are necessary to implement the desired business logic. Thus, a single action object may be modified in order to make a modification in the way a plurality of selector objects operate.

The impact of the modification on other sections of the business application can be easily discerned by identifying the selector objects that invoke the modified objects. Thus, for example, it can be determined that a change in an action object will affect the operation of multiple selector objects and thus, if the affect on one or more of these selector objects is unwanted, a new action object may be generated to compensate for the unwanted operation.

It is important to note that while the present invention has been described in the context of a fully functioning data processing system, those of ordinary skill in the art will appreciate that the processes of the present invention are capable of being distributed in a form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system of creating a personalized content delivery business application for personalizing content delivery to a requesting user, comprising:

defining one or more classifier objects, the classifier objects containing one or more classifications;

defining one or more action objects, the one or more action objects being associated with the one or more classifications and identifying functions that are to be performed in order to generate personalized content for said user;

defining at least one selector for invoking the one or more classifier objects and for invoking the one or more action objects based on the one or more classifications being applicable to current data processing system settings;

receiving, within said data processing system, a request from said user, said user being registered with said application, user description data being stored in said system when said user registered with said application;

invoking, within said data processing system, said at least one selector;

invoking, within said data processing system, one of said classifying objects by said at least one selector to determine a current classification;

determining, by said data processing system, said current classification using said user description data, said current data processing system settings, and said request;

selecting, by said data processing system, one of said action objects based on said current classification determined by said one of said classifying objects; and invoking, within said data processing system, said selected action object by said selector to generate personalized content for said user.

2. The method of claim 1, wherein the one or more classifier objects are reusable with a plurality of different selectors.

3. The method of claim 1, wherein the one or more action objects are reusable with a plurality of different selectors.

4. The method of claim 1, wherein the steps of defining are performed using a personalization tool.

5. The method of claim 4, wherein the personalization tool provides a tree-like display of the one or more classifier objects, the one or more action objects and the at least one selector.

6. The method of claim 1, wherein the one or more classifier objects are specified to determine at least one classification in which said user description data is classified, and wherein the at least one selector associates one or more action objects based on the classification of the user description data.

7. The method of claim 6, wherein the one or more classifier objects are specified to determine at least one classification in which said system settings are classified, wherein the at least one selector associates the one or more actions based on both the determination of at least one classification of the classifier object in which the user description data is classified and the determination of at least one classification of the classifier object in which the system settings are classified.

8. The method of claim 1, wherein the one or more action objects are specified to perform at least one function for personalizing information content to be delivered to a user.

9. The method of claim 8, wherein the at least one function includes at least one of selecting and formatting information for display to the user.

10. A method in a data processing system of personalizing content delivery by an application to a user, comprising:

receiving, within said data processing system, a request from said user, said user being registered with said application, user description data being stored in said system when said user registered with said application;

invoking, within said data processing system, said at least one selector;

invoking, within said data processing system, one of said classifying objects by said at least one selector to determine a current classification;

determining, by said data processing system, said current classification using said user description data, current data processing system settings, and said request;

selecting, by said data processing system, one of multiple action objects based on said current classification determined by said one of said classifying objects;

invoking, within said data processing system, said selected action object by said selector to generate personalized content for said user;

applying, by said data processing system, said classifier object to said user description data;

determining, by said data processing system, at least one classification of the classifier object in which the user description data is classified; and invoking, within said data processing system, said action object based on the determination of at least one classification of the classifier object, said action object identifying functions that are to be performed in order to generate personalized content for said user.

11. The method of claim 10, further comprising:

invoking at least one Always object, the Always object defining at least one action object that is to be invoked regardless of the determination of the at least one classification of the classifier object.

12. The method of claim 10, wherein determining at least one classification of the classifier object in which the user description data is classified includes:

determining if the user description data is not classified in any of the at least one classification of the classifier; and if the user description data is not classified in any of the at least one classification of the classifier, invoking at least one action object associated with an Otherwise object, the Otherwise object defining at least one action object that is to be invoked when the user description data is not classified in any of the at least one classification of the classifier.

13. The method of claim 10, further comprising determining at least one classification of the classifier object in which system settings are classified, wherein invoking said action object includes invoking said action object based on both the determination of at least one classification of the classifier object in which the user description data is classified and the determination of at least one classification of the classifier object in which the system settings are classified.

14. The method of claim 10, wherein the at least one action object performs at least one function for personalizing information content to be delivered to a user.

15. The method of claim 14, wherein the at least one function includes at least one of selecting and formatting information for display to the user.

16. A computer program product in a computer readable medium in a data processing system for creating a personalized content delivery business application for personalizing content delivery to a requesting user, comprising:

instructions for defining one or more classifier objects, the classifier objects containing one or more classifications;

instructions for defining one or more action objects, the one or more action objects being associated with the one or more classifications and identifying functions that are to be performed in order to generate personalized content for said user;

instructions for defining at least one selector for invoking the one or more classifier objects and for associating the one or more action objects based on the one or more classifications being applicable to current data processing system settings;

instructions for receiving a request from said user, said user being registered with said application, user description data being stored in said system when said user registered with said application;

instructions for invoking said at least one selector;

instructions for invoking one of said classifying objects by said at least one selector to determine a current classification;

instructions for determining said current classification using said user description data, said current data processing system settings, and said request;

instructions for selecting one of said action objects based on said current classification determined by said one of said classifying objects;

instructions for invoking said selected action object by said selector to generate personalized content for said user.

17. The computer program product of claim 16, wherein the one or more classifier objects are reusable with a plurality of different selectors.

18. The computer program product of claim 16, wherein the one or more action objects are reusable with a plurality of different selectors.

19. The computer program product of claim 16, wherein the computer program product is a personalization tool.

20. The computer program product of claim 19, further comprising fourth instructions for providing a tree-like display of the one or more classifier objects, the one or more action objects and the at least one selector.

21. A data processing system for creating a personalized content delivery business application for personalizing content delivery to a requesting user, comprising:

a request from said user, said user being registered with said application, user description data being stored in said system when said user registered with said application;

said data processing system including a CPU executing code for invoking at least one selector;

said at least one selector for invoking one of said classifying objects by said at least one selector to determine a current classification;

said one of said classifying objects for determining said current classification using said user description data, said current data processing system settings, and said request;

said at least one selector for selecting one of said action objects based on said current classification determined by said one of said classifying objects;

said at least one selector for invoking said selected action object to generate personalized content for said user;

the classifier objects containing one or more classifications;

the one or more action objects being associated with the one or more classifications and identifying functions that are to be performed in order to generate personalized content for said user;

said at least one selector for identifying the one or more classifier objects and for associating the one or more action objects based on the one or more classifications being applicable to said current data processing system settings.

\* \* \* \* \*